US008723059B2

(12) United States Patent
Wagstaff et al.

(10) Patent No.: US 8,723,059 B2
(45) Date of Patent: May 13, 2014

(54) SYSTEM AND METHOD FOR WEIGHING COUPLED-IN-MOTION RAILCARS LOADED WITH DISPLACEABLE MATERIAL

(75) Inventors: Edwin B. Wagstaff, Delaware, OH (US); Andrey Korolkov, Moscow (RU); Stephan Horlak, Silverthorne, CO (US)

(73) Assignee: Mettler-Toledo, LLC, Columbus, OH (US)

( * ) Notice: Subject to any disclaimer, the term of this patent is extended or adjusted under 35 U.S.C. 154(b) by 198 days.

(21) Appl. No.: 13/291,978

(22) Filed: Nov. 8, 2011

(65) Prior Publication Data
US 2013/0112487 A1    May 9, 2013

(51) Int. Cl.
*G01G 19/04* (2006.01)

(52) U.S. Cl.
USPC .............................................. 177/133; 177/1

(58) Field of Classification Search
USPC ........ 177/1, 3, 7, 25.11–25.13, 133, 136, 163
See application file for complete search history.

(56) References Cited

U.S. PATENT DOCUMENTS

| 3,646,327 | A | * | 2/1972 | Tonies et al. ..................... 377/9 |
| 3,741,327 | A | * | 6/1973 | Nordstrom et al. ............ 177/163 |
| 4,036,315 | A | * | 7/1977 | Flinth et al. ........................ 177/1 |
| 4,134,464 | A | * | 1/1979 | Johnson et al. .................... 177/3 |
| 4,317,496 | A | * | 3/1982 | Krause ........................... 177/163 |
| 4,416,342 | A | * | 11/1983 | Snead ............................. 177/163 |
| 4,756,187 | A | | 7/1988 | Gatti |
| 4,800,972 | A | | 1/1989 | Snead |
| 5,883,337 | A | * | 3/1999 | Dolan et al. .................. 177/163 |
| 6,511,023 | B2 | * | 1/2003 | Harland .................... 246/122 R |

FOREIGN PATENT DOCUMENTS

| JP | 2-141517 A | 5/1990 |
| JP | 2002-202182 A | 7/2002 |
| RU | 2077032 C1 | 4/1997 |
| RU | 2238528 C2 | 10/2004 |

* cited by examiner

*Primary Examiner* — Randy W Gibson
*Assistant Examiner* — Natalie Huls
(74) *Attorney, Agent, or Firm* — Standley Law Group LLP (57) ABSTRACT

Systems and methods for the accurate weighing of coupled-in-motion railcars carrying a flowable or otherwise displaceable material. Systems of the invention employ a scale having a pair of independent scale platforms, each of which captures weight readings while a wheel carriage of a given railcar is isolated thereon. Weight data captured by the scale platforms is analyzed and combined to determine an accurate weight for the associated railcar.

20 Claims, 7 Drawing Sheets

SYSTEM AND METHOD FOR WEIGHING COUPLED-IN-MOTION RAILCARS LOADED WITH DISPLACEABLE MATERIAL

TECHNICAL FIELD

The present invention is directed to systems and methods for accurately weighing in-motion railcars, especially railcars carrying unstable loads.

BACKGROUND

It is well known that loaded railroad cars (railcars) are typically weighed to determine the weight of the carried load. To this end, a number of known techniques have been developed to weigh loaded railcars.

Figure 1:
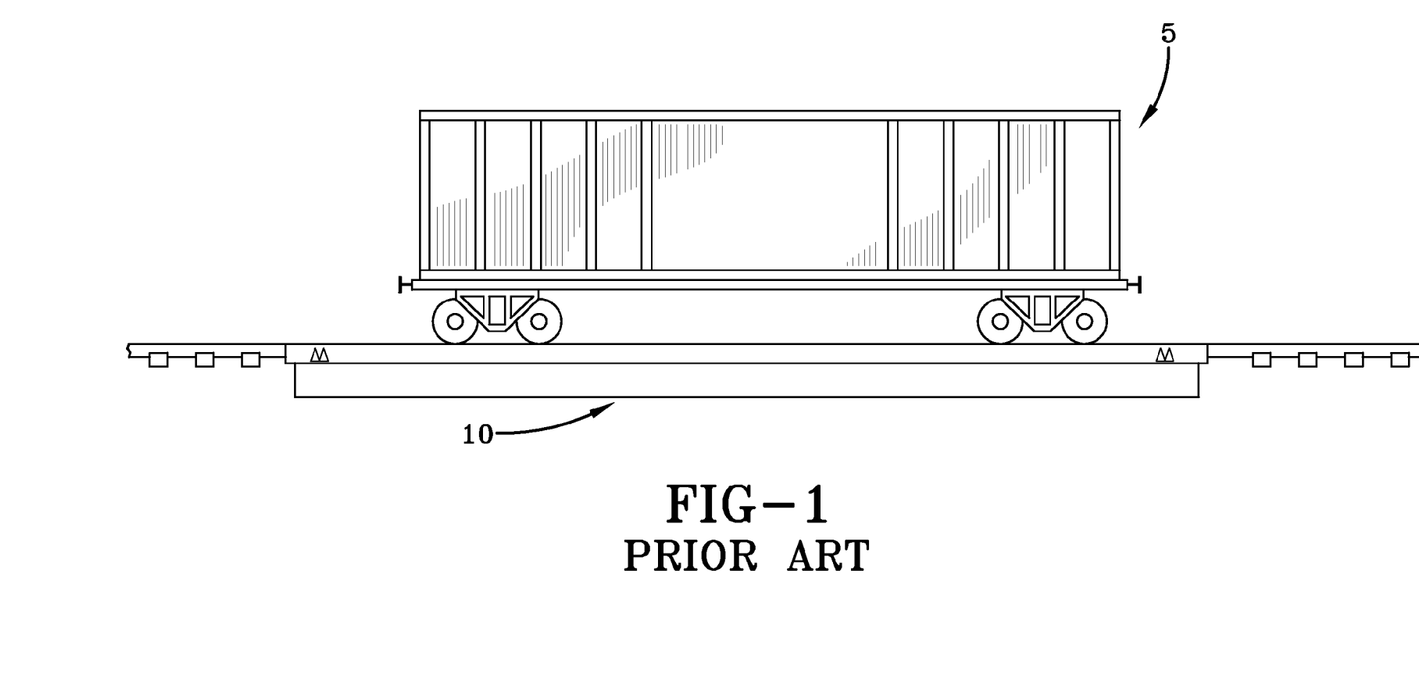
FIG. 1 illustrates the weighing of a railcar using a known single draft weighing technique.

One known technique for weighing loaded railcars is represented in FIG. 1. According to this technique, a railcar 5 to be weighed is uncoupled from the other railcars of a train and rolled over a scale platform 10 that is longer than the railcar being weighed. This weighing technique may be performed both by stopping the railcar 5 on the scale platform 10 until a stable weight is captured, or by rolling the railcar down a grade and capturing the weight of the railcar while the entire railcar resides on the scale platform. This technique is commonly referred to as a single draft weighing technique. The single draft weighing technique has proven to be the most accurate method of weighing railcars. However, as should be apparent, it is also very inefficient.

Figure 2:
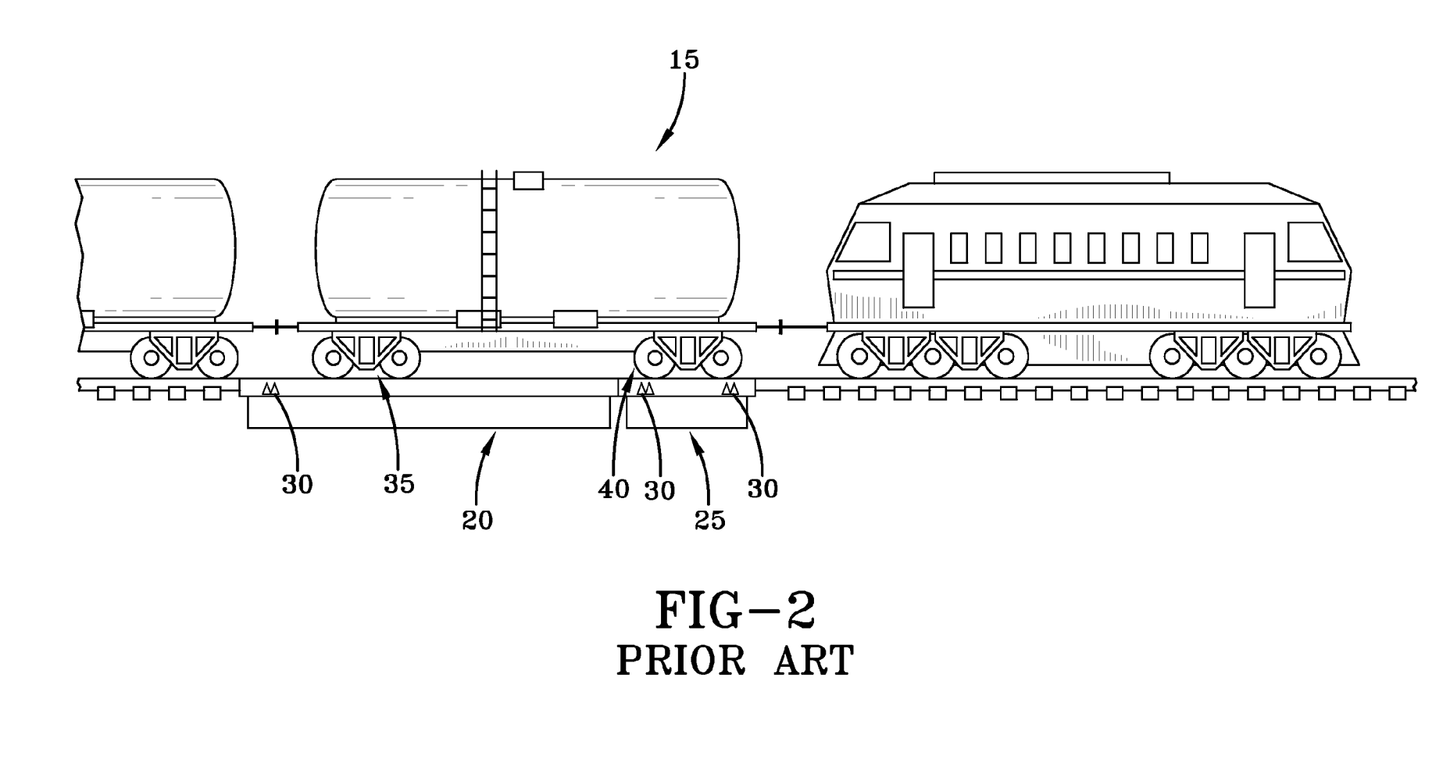
FIG. 2 illustrates the weighing of a railcar using a known wagon weighing technique.

A first coupled-in motion (CIM) technique for weighing loaded railcars is represented in FIG. 2. This technique is commonly referred to as wagon weighing. According to this technique, a loaded railcar 15 can be weighed while moving and while still coupled to the other railcars of a train. Weighing is accomplished by using two or three scale platforms of different lengths that, when combined, are longer than the longest railcar to be weighed. In the example shown in FIG. 2, two scale platforms 20, 25 are present. Track sensors 30 and software logic are used to determine when both wheel carriages 35, 40 of a given railcar are respectively isolated on the two platforms 20, 25, and a weight is captured. This improves the efficiency of the weighing process by eliminating the need to un-couple, weigh and then re-couple the railcar to the train—as must be done in accordance with the single draft weighing technique. One disadvantage of this method is that the number of different railcars that can be weighed is limited by the distance between railcars (i.e., the wheel carriages of two different railcars may simultaneously reside on the longer scale platform if the distance is too short). When the railcar-to-railcar distance falls outside of an allowed distance, the associated operating software reverts to a dual draft weighing method (see below).

Figure 3:
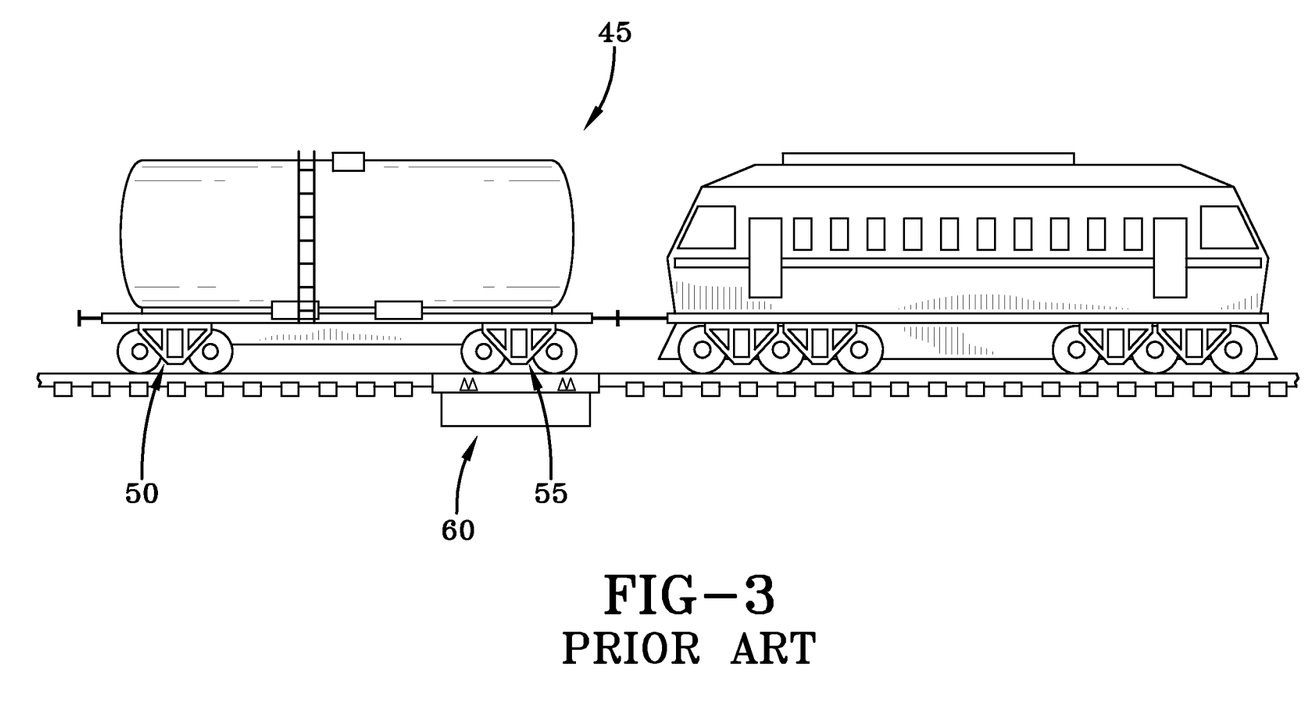
FIG. 3 illustrates the weighing of a railcar using a known dual draft weighing technique.

Another known CIM technique for weighing loaded railcars is represented in FIG. 3. This technique is commonly referred to as a dual draft weighing method. According to this technique, a railcar 45 is weighed by taking a weight reading during the dissimilar points in time when an individual first and then second wheel carriage 55, 50 of the moving railcar separately resides on a single scale having a short scale platform 60 that is only slightly longer than a wheel carriage of the railcar. The weight measurements captured by the scale with respect to each wheel carriage of the railcar are subsequently added together to determine the total railcar weight. This short platform CIM weighing method is generally the most cost effective method for weighing railcars.

The CIM dual draft weighing method works well for railcars with stable loads. However, when the commodity being moved by the railcar is flowable (e.g., a liquid), the load typically shifts (i.e., oscillates) while the railcar is moving on the rails. This oscillation degrades the dual draft weighing process since the spacing between the railcar wheel carriages is frequently sufficient lengthy so as to permit the occurrence of a weight shift from one wheel carriage toward the other within the time between weighing the first and second wheel carriages.

Therefore, there is a need for more accurately weighing a moving railcar carrying flowable or otherwise other non-stationary (i.e., displaceable) load. Systems and methods of the present invention allow for such weighing operations.

SUMMARY

Systems and methods of the present invention permit accurate CIM weighing of railcars carrying a load, such as a liquid, that oscillates or otherwise moves within the railcar. While systems of the present invention utilize a scale with two separate scale (load receiving) platforms to weigh a CIM railcar, such systems may be accurately referred to as pseudo single draft (PSD) weighing systems because their accuracy rivals that of true single draft weighing systems.

In PSD embodiments, two individual scale platforms of a railcar scale are located one after the other along the path of a train of railcars to be weighed and the scale platforms are separated by a space substantially equal to the wheel carriage spacing of an average railcar so as to provide weight readings as the two wheel carriages of a given railcar pass over the two scale platforms. More specifically, as a railcar rolls over the scale each scale platform produces a weight reading (i.e., a sampling of the weight transmitted through a given wheel carriage) at the ideal time when the associated wheel carriage of the railcar is centered on that scale platform. This eliminates or greatly reduces the time between weighing operations and enhances the accuracy of the weight readings.

One skilled in the art would realize that railcar length may vary and, therefore, individual wheel carriage weight measurements may be made at a slightly different instant in time. For example, depending on the wheel carriage spacing of a given railcar, an independent weight reading of each wheel carriage may occur substantially simultaneously as the wheel carriages reside on respective scale platforms, a first weight reading may occur when the rear wheel carriage is substantially centered on the first scale platform, or a first weight reading may occur when the front wheel carriage is substantially centered on the second scale platform. In any case, the operating software associated with such a PSD system does not need to revert to a dual draft weighing method to account for varying railcar length, as during passage of the railcar there is still a period of time when a given wheel carriage of the railcar will be temporarily isolated on an associated one of the scale platforms.

In addition to minimizing the time between weight readings by utilizing proper scale platform spacing, the time between weight readings may also be minimized by moving a train over the scale at or near an optimal speed. Consequently, a PSD system and method of the present invention provides more accurate weight readings than a dual draft system and method, and is less costly than known dual or triple platform CIM weighing systems and methods. Further, railcar weighing using a PSD weighing system and method is simplified in comparison with weighing using a known wagon weighing technique, while the accuracy of the determined railcar weights is similar. This also allows PSD systems of the present invention to qualify as legal for trade weighing systems.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 4A:
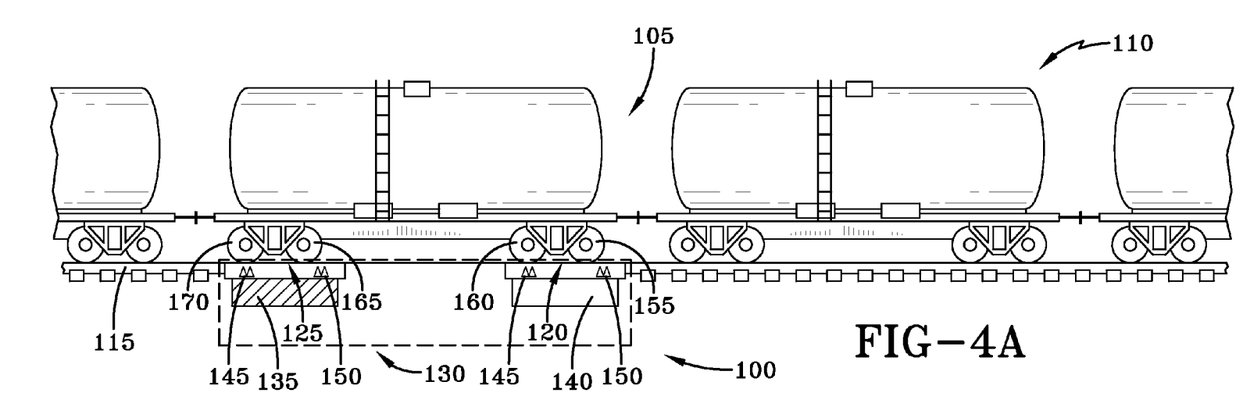
FIGS. 4A-4B depict the use of an exemplary PSD weighing system and method of the present invention to weigh a railcar having a wheel carriage-to-wheel carriage centerline distance that is substantially equal to the centerline-to-centerline distance between two scale platforms of a scale of the exemplary PSD system.
Figure 4B:
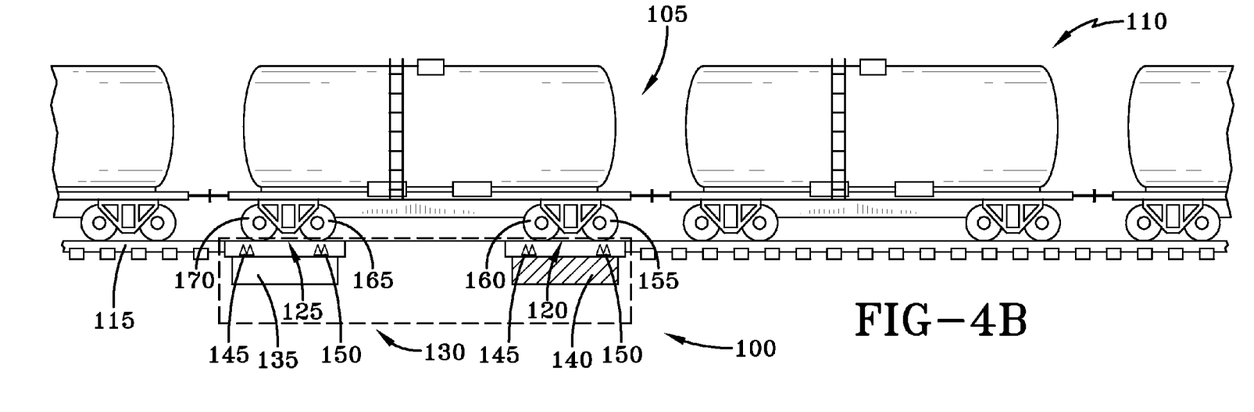

FIGS. 4A-4B depict one exemplary embodiment of a PSD weighing system 100 of the present invention being used to weigh a coupled-in-motion CIM railcar 105 of a train 110 as the train travels along a track 115. The railcar 105 is equipped with a leading and trailing wheel carriage 120, 125, as would be well known. As shown, the railcar 105 is a tanker-type car that typically carries a load, such as a liquid, that may oscillate or otherwise be displaced (shift) within the railcar as the train 110 is moving. While a PSD weighing system may be particularly applicable to the weighing of such railcars and loads, it is to be understood that the present invention may also be used to weigh non-tanker (e.g., open top) railcars, as well as railcars having stable loads. In other words, embodiments of a PSD weighing system may be used to accurately weigh CIM railcars of various types, whether carrying a stable or displaceable load.

The PSD weighing system 100 is shown to include a scale 130 having two independent scale platforms 135, 140 arranged one after the other along the direction of travel of the train 110. Thus, the scale platform identified by reference number 135 may be considered the first scale platform and the scale platform identified by reference number 140 may be considered the second scale platform for purposes of differentiation. The length of the scale platforms may be adjusted to account for differences in the distance between coupled railcars. The first and second scale platforms 135, 140 are separated by some distance that is generally substantially equal to the wheel carriage-to-wheel carriage centerline distance of a typical railcar (i.e., railcar 105), but may be varied. The wheel carriage-to-wheel carriage centerline distance may vary depending on the type of railcar to be weighed. For example, a railcar designed to carry liquefied natural gas (LNG) may have a wheel carriage-to-wheel carriage centerline distance of 54 feet. Wheel carriage-to-wheel carriage centerline distance data and other specifications for common railcars may be found at, for example:

http://www.arleasing.com/Pages/Products/Tanks.aspx

Systems and methods of the invention may be used with railcars having various wheel carriage-to-wheel carriage centerline distances, and nothing herein is to be read as limiting in that regard.

Each scale platform 135, 140 is adapted to provide an independent weight reading, as would be well understood by one skilled in the art. Consequently, when the wheel carriages 120, 125 of the railcar 105 become isolated on corresponding scale platforms 135, 140, weight readings will be taken at each scale platform that are reflective of the weight of the railcar borne by the given wheel carriage. The weight readings obtained at each scale platform 135, 140 may then be summed by a controller 200 and operating software (see FIG. 7) of the PSD weighing system 100 to accurately determine the total weight of the railcar 105.

Each scale platform 135, 140 is provided with, preferably, at least two sensors 145, 150, signals from which can be used by the controller 200 to determine when a railcar wheel carriage resides on the scale platform and, thus, when the taking of weight readings may begin and when they should end. More specifically, each scale platform 135, 140 is preferably provided with an entry sensor 145 and an exit sensor 150, each of which are actuated by leading and trailing wheels of a respective wheel carriage.

In the case of weighing the railcar 105 of FIGS. 4A-4B, activation of the entry sensor 145 of the first scale platform 135 by the leading wheel 155 of the leading wheel carriage 120 indicates to the controller 200 that the railcar is crossing onto the scale. Activation of the exit sensor 150 of the first scale platform 135 by the trailing wheel 160 of the leading wheel carriage 120 indicates to the controller 200 that the leading wheel carriage is about to exit the first scale platform and the railcar 105 is moving toward a weighing position.

As the railcar 105 continues down the track 115, activation of the entry sensor 145 of the first scale platform 135 by the leading wheel 165 of the trailing wheel carriage 125 indicates to the controller 200 that the trailing wheel carriage is crossing onto the first scale platform. Subsequent activation of the entry sensor 145 of the first scale platform 135 by the trailing wheel 170 of the trailing wheel carriage 125 indicates to the controller 200 that the trailing wheel carriage is isolated on the first scale platform. This also initiates the recording of weight readings by the first scale platform, as is indicated in FIG. 4A. Activation of the exit sensor 150 of the first scale platform 135 by the leading wheel 165 of the trailing wheel carriage 125 indicates to the controller 200 that the trailing wheel carriage is leaving the first scale platform, and may also serve as a timer initiator with respect to the time in which the weighing operation must be completed. Activation of the exit sensor 150 of the first scale platform 135 by the trailing wheel 170 of the trailing wheel carriage 125 indicates to the controller 200 that the trailing wheel carriage is about to exit the first scale platform, that the taking of weight readings should cease, and that the scale 130 may be prepared to receive the next railcar of the train 110.

Similarly, activation of the entry sensor 145 of the second scale platform 140 by the leading wheel 155 of the leading wheel carriage 120 indicates to the controller 200 that the leading wheel carriage is crossing onto the second scale platform. Subsequent activation of the entry sensor 145 of the second scale platform 140 by the trailing wheel 160 of the leading wheel carriage 120 indicates to the controller 200 that the leading wheel carriage is isolated on the second scale platform. This also initiates the recording of weight readings by the second scale platform, as is indicated in FIG. 4B.

Activation of the exit sensor 150 of the second scale platform 140 by the leading wheel 155 of the leading wheel carriage 125 indicates to the controller 200 that the leading wheel carriage is leaving the second scale platform, and may also serve as a timer initiator with respect to the time in which the weighing operation must be completed. Activation of the exit sensor 150 of the second scale platform 140 by the trailing wheel 160 of the leading wheel carriage 120 indicates to the controller 200 that the leading wheel carriage is about to exit the second scale platform, that the taking of weight readings should cease, and that the scale 130 may be prepared to receive the next railcar of the train 110.

Therefore, it can be understood from the above description and a review of FIGS. 4A-4B that independent weight readings are obtained from the first scale platform 135 while the trailing wheel carriage 125 of the railcar 105 is briefly isolated thereon, and independent weight readings are obtained from the second scale platform 140 while the leading wheel carriage 120 of the railcar is briefly isolated thereon. The weight readings obtained from each of the scale platforms 135, 140 may then be analyzed and used by the controller 200 to determine an accurate weight of the railcar 105.

Because the weight readings from the first scale platform 135 and the second scale platform 140 occur so closely together in time there is very little chance that the load carried by the railcar 105 might shift between weight readings. In fact, while the embodiment of FIGS. 4A-4B indicates that weight readings are obtained at slightly different points in time for purposes of illustration, weight readings may actually be obtained substantially simultaneously from both scale platforms 135, 140, or a weight reading may be obtained from the second scale platform 140 slightly before a weight reading is obtained from the first scale platform 135. In any case, the loaded weight of the railcar 105 as indicated by the scale platforms 135, 140 and determined by the controller 200 is highly accurate, and any influences of a shifting load on the weight determination can be largely if not completely avoided.

Figure 5A:
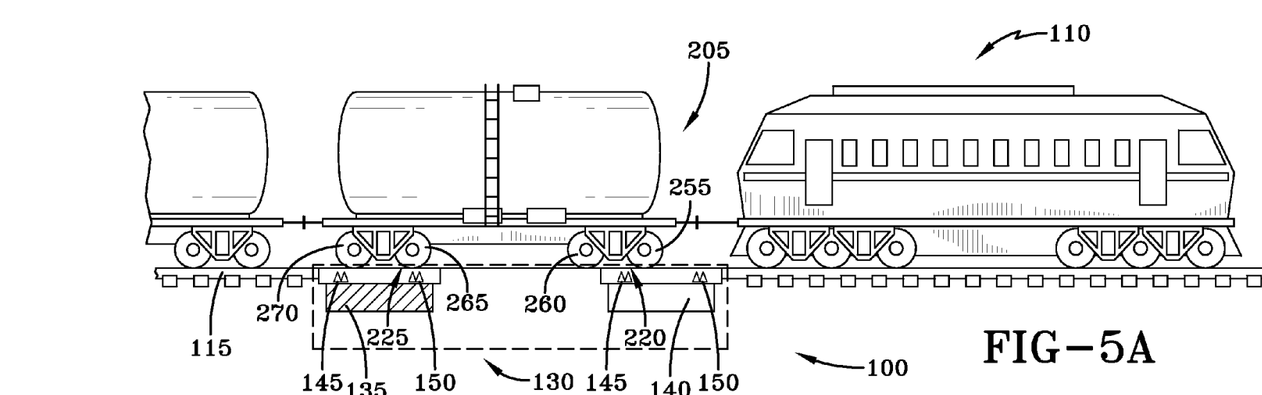
FIGS. 5A-5B depict the use of an exemplary PSD weighing system and method of the present invention to weigh a railcar having a wheel carriage-to-wheel carriage centerline distance that is slightly less than the centerline-to-centerline distance between two scale platforms of a scale of the exemplary PSD system.
Figure 5B:
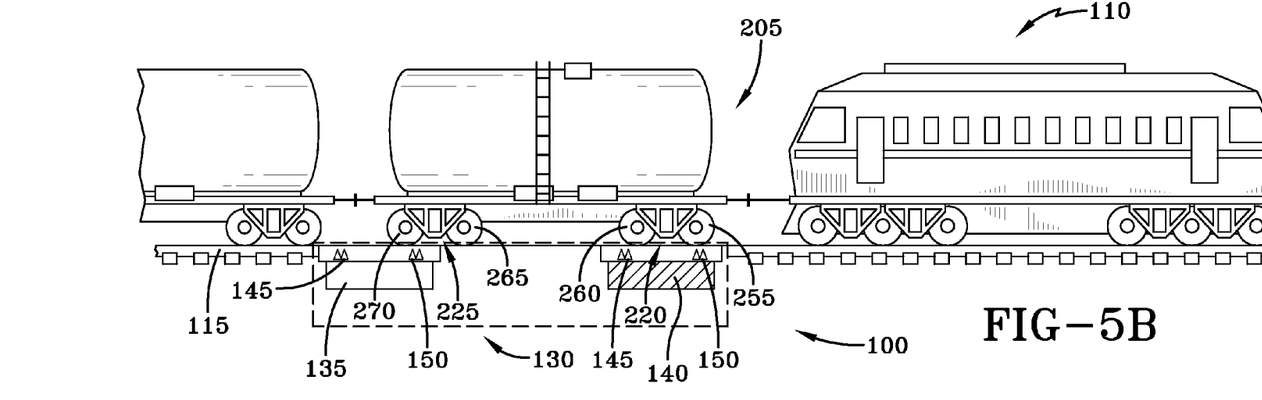

FIGS. 5A-5B depict the PSD weighing system 100 of FIGS. 4A-4B being used to weigh another CIM railcar 205 of the train 110 as the train travels along a track 115. Alternatively, the railcar 205 of FIGS. 5A-5B could be associated with a completely different train.

The railcar 205 is again equipped with a leading and trailing wheel carriage 220, 225, as is well known. The railcar 205 is again shown to be a tanker-type car for purposes of illustration only, and may present the same weighing problems as described above with respect to carrying a load that may oscillate or otherwise be displaced (shift) within the railcar as the train 110 is moving. In comparison to the railcar 105 of FIGS. 4A-4B, however, this railcar 205 has a lesser wheel carriage-to-wheel carriage centerline distance. Therefore, the wheel carriage-to-wheel carriage centerline distance of this railcar 205 is also slightly less than the centerline-to-centerline distance between the first and second scale platforms 135, 140 of the scale 130.

In the case of weighing the railcar 205 of FIGS. 5A-5B, activation of the entry sensor 145 of the first scale platform 135 by the leading wheel 255 of the leading wheel carriage 220 indicates to the controller 200 that the railcar is crossing onto the scale. Activation of the exit sensor 150 of the first scale platform 135 by the trailing wheel 260 of the leading wheel carriage 220 indicates to the controller 200 that the leading wheel carriage is leaving the first scale platform and the railcar 205 is moving toward a weighing position.

As the railcar 205 continues down the track 115, activation of the entry sensor 145 of the first scale platform 135 by the leading wheel 265 of the trailing wheel carriage 225 indicates to the controller 200 that the trailing wheel carriage is crossing onto the first scale platform. Subsequent activation of the entry sensor 145 of the first scale platform 135 by the trailing wheel 270 of the trailing wheel carriage 125 indicates to the controller 200 that the trailing wheel carriage is isolated on the first scale platform. This also initiates the recording of weight readings by the first scale platform, as is indicated in FIG. 5A. As shown, because of the shorter length of this railcar 205, the leading wheel carriage 220 does not yet fully reside on the second scale platform 140 at the time that weight reading initiation occurs at the first scale platform 135.

Activation of the exit sensor 150 of the first scale platform 135 by the leading wheel 265 of the trailing wheel carriage 225 indicates to the controller 200 that the trailing wheel carriage is leaving the first scale platform, and may also serve as a timer initiator with respect to the time in which the weighing operation must be completed. Activation of the exit sensor 150 of the first scale platform 135 by the trailing wheel 270 of the trailing wheel carriage 225 indicates to the controller 200 that the trailing wheel carriage is about to exit the first scale platform, and that the taking of weight readings should cease.

Similarly, activation of the entry sensor 145 of the second scale platform 140 by the leading wheel 255 of the leading wheel carriage 220 indicates to the controller 200 that the leading wheel carriage is crossing onto the second scale platform. Subsequent activation of the entry sensor 145 of the second scale platform 140 by the trailing wheel 260 of the leading wheel carriage 220 indicates to the controller 200 that the leading wheel carriage is isolated on the second scale platform. This also initiates the recording of weight readings by the second scale platform, as is indicated in FIG. 5B. Activation of the exit sensor 150 of the second scale platform 140 by the leading wheel 255 of the leading wheel carriage 225 indicates to the controller 200 that the leading wheel carriage is leaving the second scale platform, and may also serve as a timer initiator with respect to the time in which the weighing operation must be completed. Activation of the exit sensor 150 of the second scale platform 140 by the trailing wheel 260 of the leading wheel carriage 220 indicates to the controller 200 that the leading wheel carriage is about to exit the second scale platform, that the taking of weight readings should cease, and that the scale 130 may be prepared to receive the next railcar of the train 110.

Therefore, it can be understood from the above description and a review of FIGS. 5A-5B that an independent weight reading is obtained from the first scale platform 135 while the trailing wheel carriage 225 of the railcar 205 briefly resides thereon, and an independent weight reading is obtained from the second scale platform 140 while the leading wheel carriage 220 of the railcar briefly resides thereon. The weight readings obtained from each of the scale platforms 135, 140 may then be analyzed and used by the controller 200 to determine an accurate weight of the railcar 205.

Because the weight readings from the first scale platform 135 and the second scale platform 140 occur so closely together in time there is very little chance that the load carried by the railcar 205 might shift between weight readings. Thus, the loaded weight of the railcar 205 as indicated by the scale platforms 135, 140 and determined by the controller 200 is highly accurate, and any influences of a shifting load on the weight determination can be largely if not completely avoided.

Figure 6A:
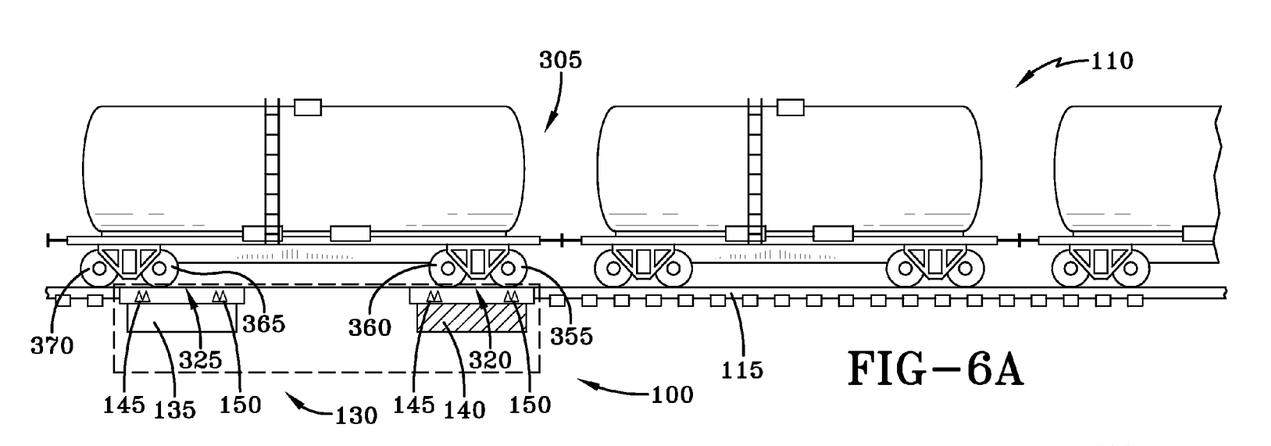
FIGS. 6A-6B depict the use of an exemplary PSD weighing system and method of the present invention to weigh a railcar having a wheel carriag-to-wheel carriage centerline distance that is slightly greater than the centerline-to-centerline distance between two scale platforms of a scale of the exemplary PSD system.
Figure 6B:
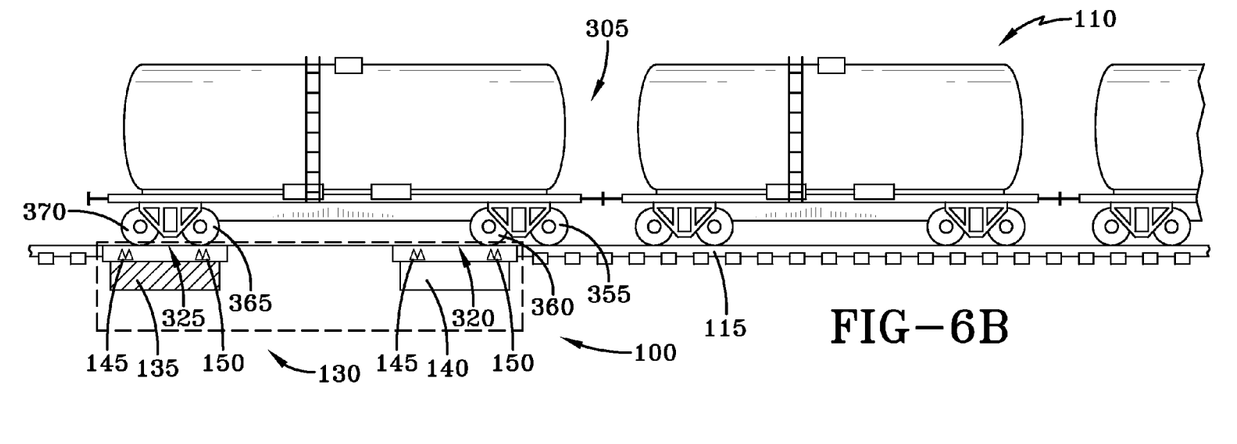

FIGS. 6A-6B depict the PSD weighing system 100 of FIGS. 4A-4B being used to weigh another CIM railcar 305 of the train 110 as the train travels along a track 115. Alternatively, the railcar 305 of FIGS. 6A-6B could be associated with a completely different train.

The railcar 305 is equipped with a leading and trailing wheel carriage 320, 325, as is well known. The railcar 305 is again shown to be a tanker-type car for purposes of illustration only, and may present the same weighing problems as described above with respect to carrying a load that may oscillate or otherwise be displaced (shift) within the railcar as the train 110 is moving. In comparison to the railcar 105 of FIGS. 4A-4B and the railcar 205 of FIGS. 5A-5B, however, this railcar 305 has a greater wheel carriage-to-wheel carriage centerline distance. In this case, the wheel carriage-to-wheel carriage centerline distance of the railcar 305 is actually slightly greater than the centerline-to-centerline distance between the first and second scale platforms 135, 140 of the scale 130.

In the case of weighing the railcar 305 of FIGS. 6A-6B, activation of the entry sensor 145 of the first scale platform 135 by the leading wheel 355 of the leading wheel carriage 320 indicates to the controller 200 that the railcar is crossing onto the scale. Activation of the exit sensor 150 of the first scale platform 135 by the trailing wheel 360 of the leading wheel carriage 320 indicates to the controller 200 that the leading wheel carriage is about to exit the first scale platform and the railcar 305 is moving toward a weighing position.

Because of the greater distance between the wheel carriages 320, 325 of this railcar 305, a first weight reading is obtained from the second scale platform as the leading wheel carriage crosses thereover. Activation of the entry sensor 145 of the second scale platform 140 by the leading wheel 355 of the leading wheel carriage 320 of the railcar 305 indicates to the controller 200 that the leading wheel carriage is crossing onto the second scale platform. Subsequent activation of the entry sensor 145 of the second scale platform 140 by the trailing wheel 360 of the leading wheel carriage 320 indicates to the controller 200 that the leading wheel carriage is isolated on the second scale platform. This also initiates the recording of weight readings by the second scale platform, as is indicated in FIG. 6A.

Activation of the exit sensor 150 of the second scale platform 140 by the leading wheel 355 of the leading wheel carriage 325 indicates to the controller 200 that the leading wheel carriage is leaving the second scale platform, and may also serve as a timer initiator with respect to the time in which the weighing operation must be completed. Activation of the exit sensor 150 of the second scale platform 140 by the trailing wheel 360 of the leading wheel carriage 320 indicates to the controller 200 that the leading wheel carriage is about to exit the second scale platform and that the taking of weight readings should cease.

As the railcar 305 continues down the track 115, activation of the entry sensor 145 of the first scale platform 135 by the leading wheel 365 of the trailing wheel carriage 325 indicates to the controller 200 that the trailing wheel carriage is crossing onto the first scale platform. Subsequent activation of the entry sensor 145 of the first scale platform 135 by the trailing wheel 370 of the trailing wheel carriage 325 indicates to the controller 200 that the trailing wheel carriage is isolated on the first scale platform. This also initiates the recording of weight readings by the first scale platform, as is indicated in FIG. 6B. As shown, because of the greater length of this railcar 305, the leading wheel carriage 320 may still reside on the second scale platform 140 and the taking of weight readings by each scale platform may overlap to some extent. Whether or not this occurs will depend on the exact spacing of the scale platforms 135, 140 and the centerline-to-centerline distance of the wheel carriages 320, 325.

Subsequent activation of the exit sensor 150 of the first scale platform 135 by the leading wheel 365 of the trailing wheel carriage 325 indicates to the controller 200 that the trailing wheel carriage is leaving the first scale platform, and may also serve as a timer initiator with respect to the time in which the weighing operation must be completed. Activation of the exit sensor 150 of the first scale platform 135 by the trailing wheel 370 of the trailing wheel carriage 325 indicates to the controller 200 that the trailing wheel carriage is about to exit the first scale platform, that the taking of weight readings should cease, and that the scale 130 may be prepared to receive the next railcar of the train 110.

Therefore, it can be understood from the above description and a review of FIGS. 6A-6B that independent weight readings are obtained from the first scale platform 135 while the trailing wheel carriage 325 of the railcar 305 is briefly isolated thereon, and independent weight readings are obtained from the second scale platform 140 while the leading wheel carriage 320 of the railcar is briefly isolated thereon. The weight readings obtained from each of the scale platforms 135, 140 may then be analyzed and used by the controller 200 to determine an accurate weight of the railcar 305.

Because the weight readings from the first scale platform 135 and the second scale platform 140 occur so closely together in time, despite the increased centerline-to-centerline distance of the wheel carriages 320, 325 of this embodiment, there is very little chance that the load carried by the railcar 305 might shift between weight readings. Thus, the loaded weight of the railcar 305 as indicated by the scale platforms 135, 140 and determined by the controller 200 is highly accurate, and any influences of a shifting load on the weight determination can be largely if not completely avoided.

Figure 7:
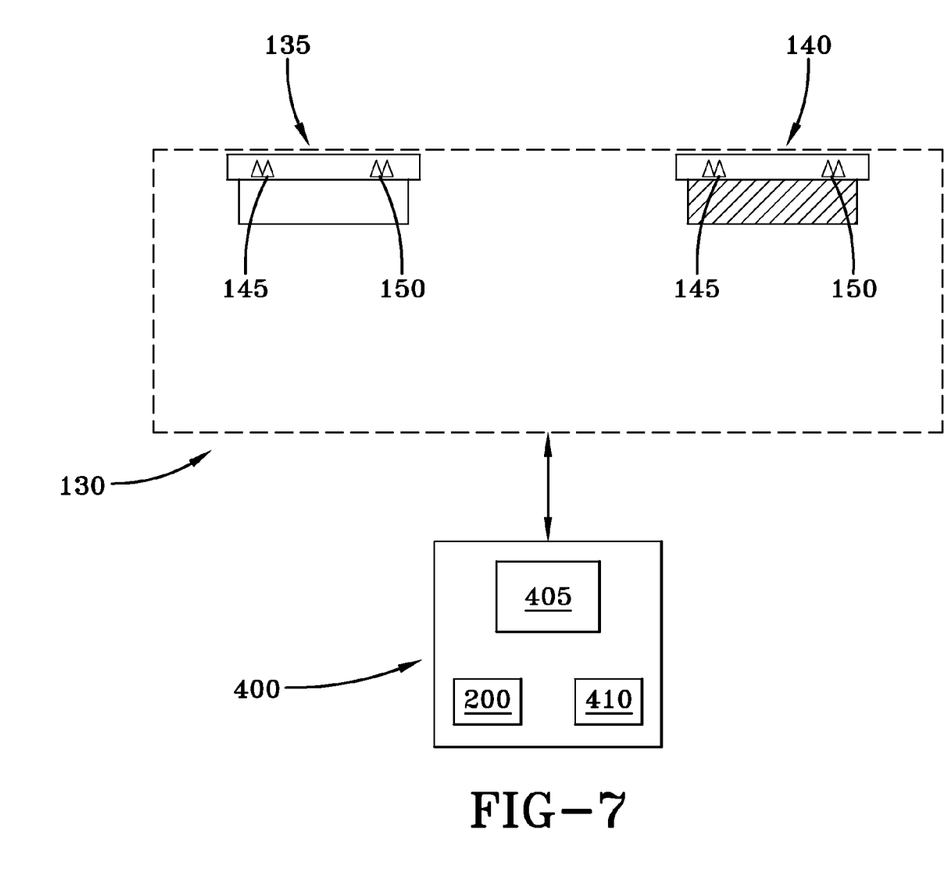
FIG. 7 schematically illustrates control and reporting portions of an exemplary PSD weighing system in communication with a scale portion thereof.

An exemplary PSD weighing system according to the present invention is schematically represented in FIG. 7, as is the intercommunication between the scale platforms 135, 140, scale platform sensors 145, 150, and controller 200 and associated software thereof. The system is shown to include a controller 200 and associated software for overseeing the described in-motion weighing operations and determining the weight of a given railcar (as described in more detail below). The system can distinguish between locomotives and railcars based on the difference in length therebetween, as well as between different railcar sizes based on railcar speed and time between activation of the scale platform sensors. A system and method of the present invention may be operable to accurately weigh CIM railcars within some range of railcar speeds.

The system controller 200 may be a part of a user terminal 400 that includes a display 405 for indicating information such as the weight of a weighed railcar, the summed weight of all weighed railcars of a given train, railcar speed and direction, etc. Summary information may be provided, for example, once a train weighing operation is complete. The terminal may also provide operator access to reporting and setup functions. The terminal may also include a database that allows for the storage of weight data and train weighing reports, and may offer a report or other data export function via a wired or wireless data communication connection. Alternatively, weight data, train reports, etc., may be stored at another location, preferably a location that is in communication with the terminal.

As can be understood from the foregoing description of exemplary embodiments, a weighing operation according to the present invention preferably begins when the entry sensor of a given scale platform indicates that a railcar wheel carriage is isolated on the scale platform, and ends when the exit sensor of the scale platform indicates that the wheel carriage is about to exit the scale platform. This typically results in the generation and storage of a plurality of in-motion weight reading windows. The number of weight reading windows collected may vary depending on the speed of the railcar. The on/off switching of the scale platform entry and exit sensors may be used to time stamp a given weight reading.

As should be realized, a most accurate weight reading will be obtained when the wheel carriage of a railcar is centered or substantially centered on the scale platform. To this end, the weight readings (data) obtained while the wheel carriages are isolated on the scale platforms are stored (such as at the scale controller terminal) and the stored weight readings are analyzed by the controller to determine the flattest window recorded during weighing of the individual railcar wheel carriages. The flattest window is the window with the smallest sum of the absolute deviations from the average of each window. Once the flattest window is determined, the weight value of the center of the window is used for the railcar weight supported by the railcar wheel carriage on the scale platform. Preferably, a system of the present invention ensures that at least one full window of weight data is accumulated and available for analysis.

Systems and methods of the present invention allow for the highly accurate weighing of CIM railcars loaded with flowable or otherwise displaceable materials whose movement might improperly and undesirably influence weight readings produced by known CIM weighing systems. Consequently, systems and methods of the present invention may be used in legal for trade weighing applications.

It should also be noted that while the accuracy of known single draft weighing techniques degrades as the speed of railcars to be weighed increases, the accuracy of the inventive PSD weighing technique improves (or at least does not degrade). Such an improvement in weighing accuracy occurs because the time between carriage weighings decreases as the speed of the railcar increases. Consequently, weight readings are taken at shorter intervals, which further reduces any chance that a shifting load can influence the weight readings. As a result, it may be possible to use PSD system and method of the invention to accurately weigh railcars moving at a speed that is too great (e.g., 20 Km/h) to permit accurate measurement by known single draft weighing techniques.

While certain embodiments of the present invention are described in detail above, the scope of the invention is not to be considered limited by such disclosure, and modifications are possible without departing from the spirit of the invention as evidenced by the following claims:

What is claimed is:

1. A system for weighing moving railcars, comprising:
a scale disposed along the path of travel of the railcars to be weighed, the scale for providing multiple railcar weight readings and including first and second independent scale platforms over which travel wheel carriages of the railcars to be weighed;
a distance between the first and second scale platforms, the distance between scale platforms being selected to minimize the time between weight readings;
sensors on each scale platform, the sensors being actuatable by leading and trailing wheels of each railcar wheel carriage; and
a controller having associated software and in communication with the scale, the controller adapted to use signals from the scale platform sensors to determine when a railcar wheel carriage is isolated on a corresponding scale platform, to capture an independent weight reading from the first scale platform only during a period of time when a trailing wheel carriage is isolated thereon, and to capture an independent weight reading from the second scale platform only during a period of time when a leading wheel carriage is isolated thereon, the weight readings from the first scale platform captured at a different time than the weight readings from the second scale platform, the controller further combining the independent and time separated weight readings from the first and second scale platforms to determine the weight of a given railcar.

2. The system of claim 1, wherein a scale platform includes more than one entry sensor and more than one exit sensor and the sensors are inductance sensors.

3. The system of claim 1, wherein each scale platform includes an entry sensor located and adapted to provide a signal when a wheel carriage passes onto the scale platform and an exit sensor located and adapted to provide a signal when a wheel carriage leaves the scale platform.

4. The system of claim 1, wherein the distance between the first and second scale platforms is approximately equal to the carriage-to-carriage centerline distance of an average railcar.

5. The system of claim 1, wherein the controller is part of a terminal that further includes a display for providing information about railcars being weighed.

6. The system of claim 5, wherein the terminal further comprises a database for storing weighing information.

7. The system of claim 6, wherein the terminal includes wired or wireless communication functionality such that weight data can be exported or accessed remotely.

8. A coupled-in-motion system for weighing railcars loaded with displaceable material, comprising:
a scale for providing multiple railcar weight readings, the scale including a first independent scale platform over which travel wheel carriages of the railcars to be weighed and a second independent scale platform over which travel wheel carriages of the railcars to be weighed, the second scale platform located after the first scale platform along a path of travel of the railcars to be weighed;
a distance between the first and second scale platforms, the distance between the scale platforms being approximately equal to the carriage-to-carriage centerline distance of an average railcar;
an entry sensor and an exit sensor located on each scale platform, the sensors being actuatable by leading and trailing wheels of each railcar wheel carriage to indicate the position of a wheel carriage relative to a given scale platform; and
a controller in communication with the scale, the controller adapted to use signals from the scale platform sensors to determine when a given railcar wheel carriage is isolated on a corresponding scale platform, to capture an independent weight reading from the first scale platform only during a period of time when a trailing wheel carriage is isolated thereon, and to capture an independent weight reading from the second scale platform only during a period of time when a leading wheel carriage is isolated thereon, the weight readings from the first scale platform and the second scale platform being captured at slightly different points in time, the controller, in conjunction with associated software, being further operative to combine the independent and time separated weight readings from the first and second scale platforms to determine the weight of a given moving railcar.

9. The system of claim 8, wherein the entry and exit sensors are inductance sensors.

10. The system of claim 8, wherein a scale platform includes more than one entry sensor and more than one exit sensor.

11. The system of claim 8, wherein the controller is part of a terminal that further includes a display for providing information about railcars being weighed.

12. The system of claim 11, wherein the terminal further comprises a database for storing weighing information.

13. The system of claim 12, wherein the terminal includes wired or wireless communication functionality such that weight data can be exported or accessed remotely.

14. A method for coupled-in-motion weighing of railcars loaded with displaceable material, comprising:
    providing a scale for producing multiple railcar weight readings, the scale including:
        a first independent scale platform located such that the wheel carriages of railcars to be weighed pass thereover and a second independent scale platform located such that the wheel carriages of the railcars to be weighed pass thereover, the second scale platform located after the first scale platform along a path of travel of the railcars to be weighed and separated by a distance that is approximately equal to the carriage-to-carriage centerline distance of an average railcar,
        an entry sensor and an exit sensor located on each scale platform, the sensors being actuatable by leading and trailing wheels of each railcar wheel carriage to indicate the position of a wheel carriage relative to a given scale platform, and
        a controller in communication with the scale, the controller using signals from the scale platform sensors to determine when a given railcar wheel carriage is isolated on a corresponding scale platform, to capture an independent weight reading from the first scale platform only during a period of time when a trailing wheel carriage is isolated thereon, and to capture an independent weight reading from the second scale platform only during a period of time when a leading wheel carriage is isolated thereon, isolation of the trailing wheel carriage on the first scale platform and the capture of a weight reading therefrom occurring at a slightly different point in time than isolation of the leading wheel carriage on the second scale platform and the capture of a weight reading therefrom;
    recording the weight readings taken by the scale platforms of the scale; and
    using the controller, in conjunction with associated software, to analyze and combine the independent and time separated weight readings from the first and second scale platforms to determine the weight of a given moving railcar.

15. The method of claim 14, wherein weight readings are captured in an order selected from the group consisting of: a weight reading from the second scale platform and then a weight reading from the first scale platform; and a weight reading from the first scale platform and then a weight reading from the second scale platform.

16. The method of claim 14, wherein:
    the controller is part of a terminal that further includes a display and information about railcars being weighed is shown on the display;
    weighing information is stored in a database associated with the terminal; and
    the terminal further includes wired or wireless communication functionality such that weight data can be exported or accessed remotely.

17. The method of claim 14, wherein a number of windows of in-motion weight reading data are captured and stored each time a given railcar wheel carriage passes over a corresponding one of the scale platforms.

18. The method of claim 17, wherein stored weight readings are analyzed by the controller to determine the flattest window recorded during weighing of the individual railcar wheel carriages and, once the flattest window is determined, the weight value of the center of the window is used for the railcar weight.

19. The method of claim 18, wherein the flattest window is the window with the smallest sum of the absolute deviations from the average of each window.

20. The method of claim 14, wherein the on/off switching of the scale platform entry and exit sensors is used to time stamp a given weight reading.

* * * * *